May 15, 1928.
Re. 16,965
F. H. SMITH ET AL
AUTOMOBILE BRAKE BAND
Original Filed June 12, 1919 2 Sheets-Sheet 1
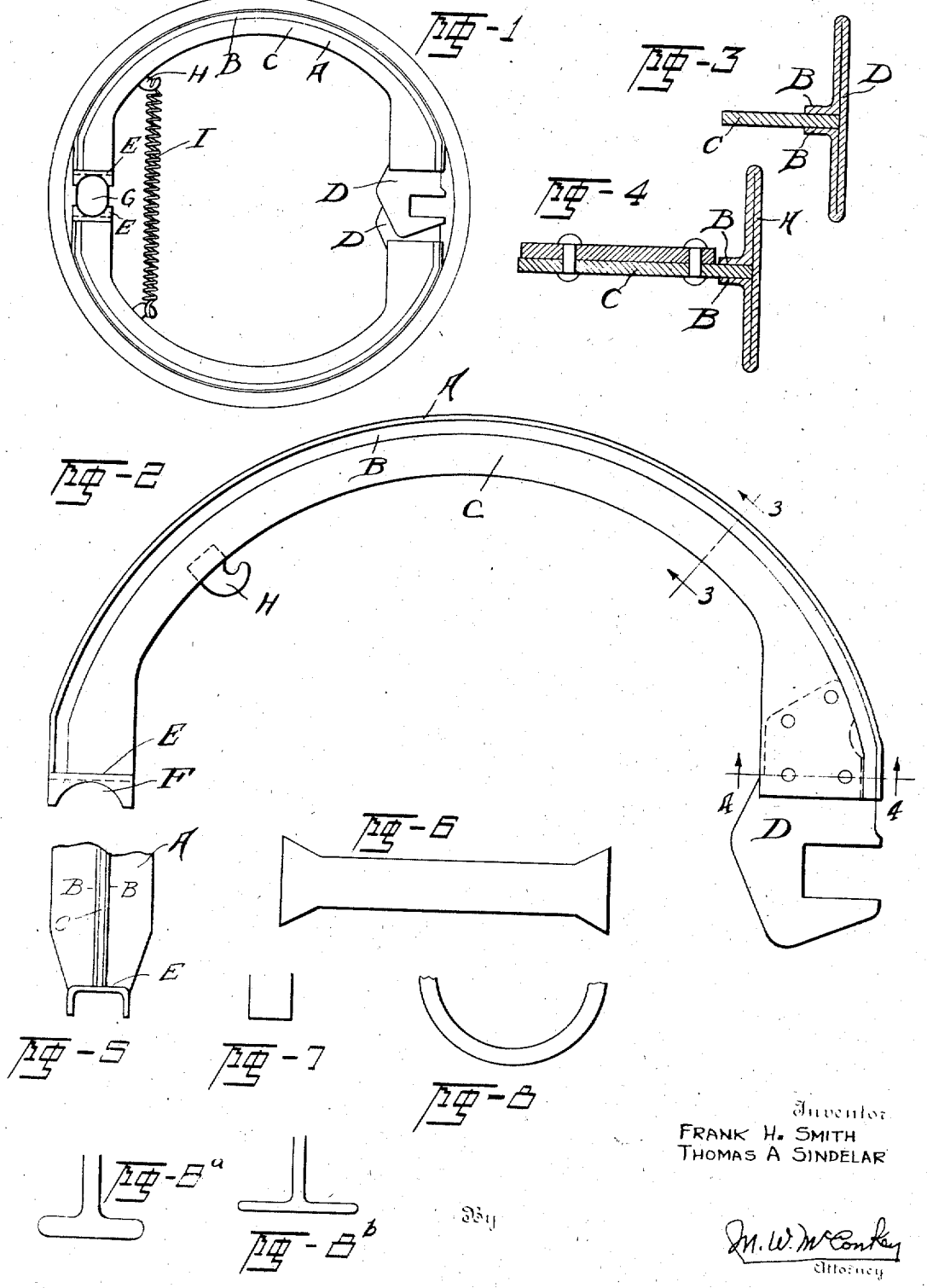
Inventor
FRANK H. SMITH
THOMAS A SINDELAR
By
M. W. McConkey
Attorney May 15, 1928.
Re. 16,965
F. H. SMITH ET AL.
AUTOMOBILE BRAKE BAND
Original Filed June 12, 1919 2 Sheets-Sheet 2
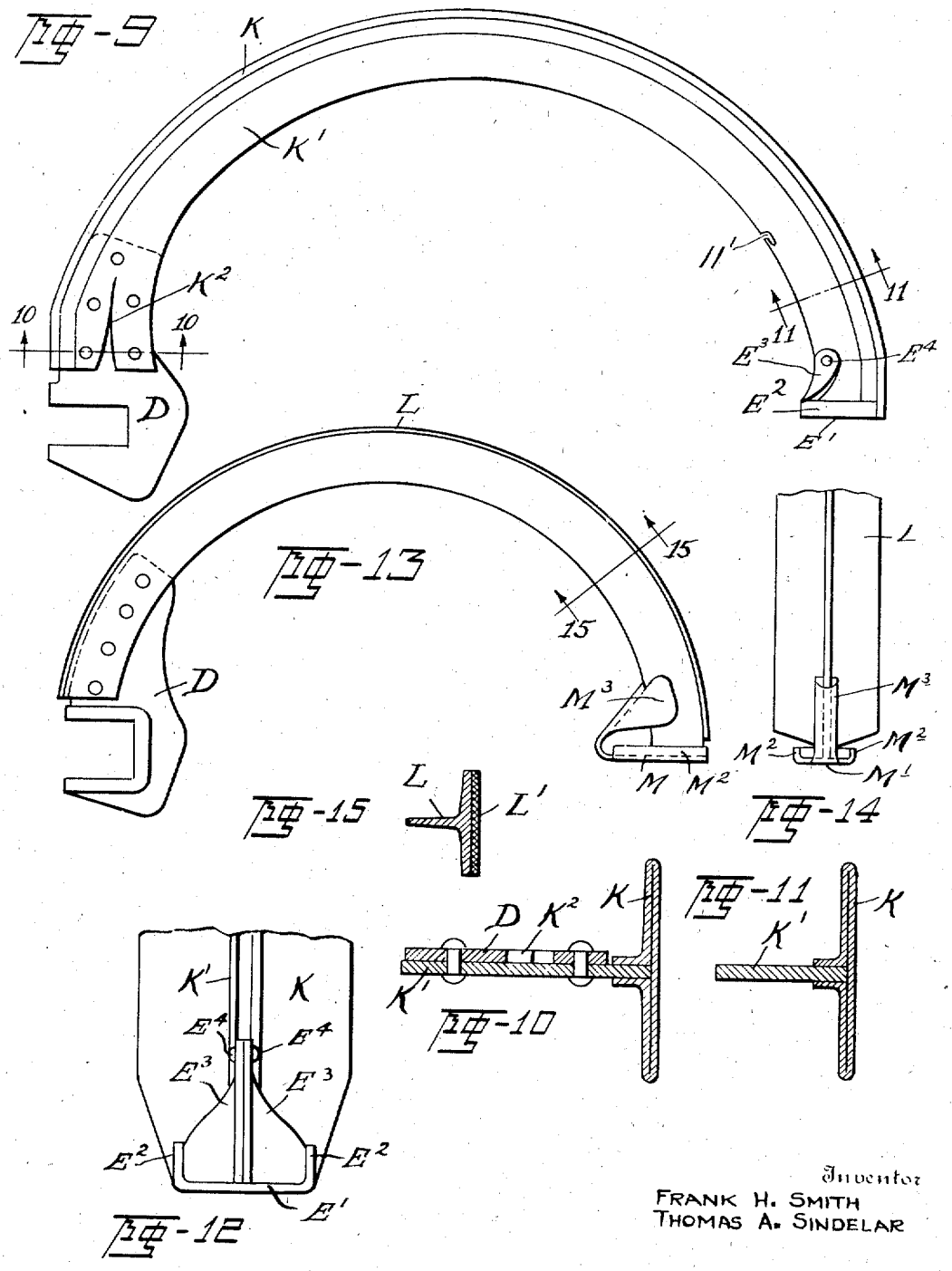
Inventor
FRANK H. SMITH
THOMAS A. SINDELAR
By
M. W. McConkey
Attorney Reissued May 15, 1928. Re. 16,965

UNITED STATES PATENT OFFICE.

FRANK H. SMITH AND THOMAS A. SINDELAR, OF CLEVELAND, OHIO, ASSIGNORS, BY MESNE ASSIGNMENTS, TO BENDIX BRAKE COMPANY, OF CHICAGO, ILLINOIS, A CORPORATION OF ILLINOIS.

AUTOMOBILE BRAKE BAND.

Original No. 1,526,098, dated February 10, 1925, Serial No. 303,686, filed June 12, 1919. Application for reissue filed July 1, 1925. Serial No. 40,945.

This invention relates generally to brakes for automobile wheels and more particularly to the construction in the internal brake band. The object is to provide a simple and inexpensive construction of internal brake band and with this object in view the invention consists in the novel features of construction hereinafter fully described and set forth in the appended claims.

In the drawings forming a part of this specification, Figure 1 is a diagrammatic view showing the mode of application of our invention; Figure 2 is a detail view of one section of the brake band removed from the drum; Figure 3 is a detail sectional view on the line 3—3 of Figure 2; Figure 4 a sectional view on the line 4—4 of Figure 2; Figure 5 is a face view of one end and Figure 6 is a plan view of a blank for forming the entire section from a single piece of metal; and Figures 7, 8, $8^a$ and $8^b$ are detail views illustrating the various steps of making the one-piece section; Figure 9 shows a modified form of construction; Figure 10 is a section on the line 10—10 of Figure 9: and Figure 11 is a section on the line 11—11 of Figure 9; Figure 12 is a face view of one end; Figure 13 shows a further modification; Figure 14 is a face view of one end of the same; and Figure 15 is a section on the line 15—15 of Figure 13.

In carrying out our invention we employ a strip of sheet metal which is rolled to provide a double semi-circular band A having inwardly projecting parallel flanges B and inserted between said parallel flanges and secured thereto by welding, brazing or otherwise is a semi-circular plate C which being in a plane perpendicular to the surface of the band serves as a strengthening means for the rolled sheet metal band. The sheet metal being rolled back upon itself as shown and thereby providing a band of double thickness will have considerable rigidity and this coupled with the semi-circular strip or plate C will provide a brake band sector of sufficient strength to withstand all the strains placed thereon. To one end of the sector thus formed is attached the usual or any preferred type of fitting D and at the opposite end of the sector there is arranged a shoe E, this being preferably channel shaped and pressed from sheet metal and welded to the end of the sector composed of the band and plate and the end of this shoe is cut away in the form of a semi-circle as shown at F in order to engage the cam G for actuating the brake band sectors. A sheet metal hook H is welded to the plate portion of the sector as shown and adapted to receive the spring I which normally holds the brake band out of engagement. The fitting is connected to the end of the sector by rivets or in any other suitable manner. A brake band constructed as herein shown and described is exceedingly strong, durable, easily fabricated, and in operation preferable to a cast or forged band.

In Figures 6, 7, 8 and $8^a$ and $8^b$ we have shown a slightly modified form of band in which the cylindrical band portion and the inwardly projecting reinforcing rib are all formed from a single piece of sheet metal, the plate being first bent into channel form, then curved to produce the semi-circle and then transformed by the proper pressing operations into a T-shaped band comprising in a single piece the semi-circular cylindrical or band portion and the inwardly projecting rib or reenforcing portion. The fitting and the shoe and likewise the hook will be connected as previously described.

In the construction shown in Figure 9, the band K is made of pressed metal as previously described, and has the plate K′ connected thereto as previously set forth. The end of the plate however to which the fitting D is attached is split and spread as shown at $K^2$ in order to provide a broad point of attachment for the fitting. The shoe E′ is constructed with the side flanges $E^2$ and ears $E^3$ which are connected to the plate by rivets $E^4$. The hook H′ is provided by cutting an L-shaped notch in the plate member.

In the construction illustrated in Figure 13, the band L is T-shaped in cross section, this being formed from a rolled section and given the proper semi-circular shape and provided with a suitable facing L′. The fitting D is riveted to one end as heretofore described, and a shoe M connected to the opposite end is pressed from sheet metal and comprises flat portion M′ having the flanges $M^2$ and the integral brace ears $M^3$ welded or otherwise secured to the band and it will of course be understood that the flat portion of the shoe is also welded to the end of the bearing. Brake bands constructed as herein shown and described can be made much cheaper than the bands heretofore made by casting or forging, and have been found superior in operation.

Having thus described our invention, what we claim is:

1. A sheet metal brake shoe comprising a curved portion having inwardly extending parallel flanges, a curved strip or plate arranged between said flanges and rigidly connected thereto, and a sheet metal member rigidly connected to one end of said band.

2. A sheet metal brake band having a semi-circular plate rigidly connected thereto and providing a T-shaped brake member, one end of said plate being expanded, a fitting secured to said expanded end, a shoe rigidly connected to the opposite end of the brake member, said shoe comprising a flanged flat portion and integral braced ears, said ears and flat portions being welded to the end of the brake member.

3. A brake shoe comprising an angle-shaped pressed metal member including a plurality of separably-formed stampings permanently secured together and a separately formed thrust member secured to one end thereof.

4. A brake shoe comprising two angular sections secured back to back and a reenforcing member secured across the free faces of said angular sections.

5. A brake shoe comprising two substantially semi-circular members of L-shaped section secured back to back, a reenforcing strip conforming with and secured to the free faces thereof, and friction material secured to said reenforcing strip.

6. A brake shoe comprising two stamped metal parts of L-shaped section secured back to back, the free faces thereof conforming in shape to a cylindrical surface, and a reenforcing member secured to and extending over said cylindrical surface.

7. A brake shoe comprising an angle-shaped pressed metal member including a substantially cylindrical lining-supporting part and radial flanges, and a radial contact member secured across one end thereof.

8. A brake shoe comprising two angular L-shaped sections arranged back to back and a reenforcing lining-supporting part extending across the outer faces of said angular sections.

9. A brake shoe comprising two substantially semi-circular parts of L-shaped section arranged back to back, a reenforcing part conforming with and secured to the outer faces thereof, and friction material secured to said reenforcing part.

10. A brake shoe comprising two stamped metal parts of L-shaped section arranged back to back, the outer faces thereof conforming in shape to a cylindrical surface, and a reenforcing member extending over said cylindrical surface.

11. A brake shoe having pressed metal parts each of which includes a central radial flange and a cylindrical flange, the two cylindrical flanges extending oppositely outward, and a separate piece secured to said radial flanges and with them forming a central stiffening web.

12. A brake shoe having pressed metal parts each of which includes a central radial flange and a cylindrical flange, the two cylindrical flanges extending oppositely outward, a separate piece secured to said radial flanges and with them forming a central stiffening web, and a contact member extending across the central web and transmitting the brake-applying thrust directly thereto.

13. A brake shoe comprising a curved portion having inwardly extending parallel flanges, and a curved strip secured between said flanges.

14. A brake shoe of pressed metal including two connected parts, each including a radial stiffening flange and a cylindrical flange integral with each other.

15. A brake shoe of pressed metal including two connected parts, each including a central radial stiffening flange and an outwardly-extending cylindrical flange integral with each other.

16. A brake shoe of metal pressed to provide a cylindrical lining-supported part and two radially-extending stiffening flanges.

17. A brake shoe of metal pressed to provide a cylindrical lining-supporting part and two radially-extending stiffening flanges spaced inwardly from the edges of the lining-supporting part.

18. A brake shoe comprising a pressed-metal body with separately-formed means at one end for pivotally anchoring it and with separately formed means at the other end for operative engagement with a brake-applying device.

19. A brake shoe composed at least in part of pressed metal and including an outer cylindrically-curving portion forming the friction face, and reinforcing portions continued toward each other from opposite sides of the friction face and which are secured together in a joint running lengthwise of the shoe.

20. A pressed metal brake shoe having parts arranged to reinforce each other and comprising a plurality of separately-formed stampings permanently secured together.

21. A brake shoe comprising two separately-formed parts, one being a cylindrical band forming the friction face of the shoe and the other being a flat plate forming a stiffening web, said plate being attached at its outer edge to the inner face of said band.

22. A brake shoe comprising two separately-formed parts, one being a cylindrical band forming the friction face of the shoe and the other being a flat plate forming a stiffening web, said plate being welded at its outer edge to the inner face of said band.

23. A brake shoe comprising a cylindrical band and a separately-formed stiffening member secured to the inner face of said band substantially on its center line.

24. A brake shoe comprising a cylindrical band and a separately-formed stiffening member secured to the inner face of said band, together with a separately-formed anchor fitting attached to one end of said stiffening member.

25. A brake shoe comprising a cylindrical band and a separately-formed stiffening member secured to the inner face of said band, said separately-formed web having means at one end for engagement with an anchor and having at its other end means for engagement with a brake-applying device.

26. A brake shoe comprising two parts of L-shaped section arranged back to back, in combination with a separately-formed stiffening web member secured between said parts.

27. A brake shoe comprising two parts of L-shaped section arranged back to back.

28. A brake shoe comprising two parts having radial portions secured together to stiffen the shoe between its edges and having cylindrical portions on opposite sides of said radial portions.

29. A brake shoe comprising a double-thickness cylindrical band formed of a steel stamping and having a stiffening rib between its edges.

30. A brake shoe comprising a stiffening web member and a cylindrical lining carrying member having means engaging at least one side of the web member and permanently secured thereto.

31. A brake shoe comprising a pressed sheet-metal body structure including a lining-supporting cylindrical portion and two reinforcing portions which are integrally connected to the opposite sides of the cylindrical portion and which are secured together to reinforce each other.

32. A brake shoe formed at least in part of pressed sheet metal and having a cylindrical lining-carrying portion and two stiffening portions, each of which is integral with one side of the lining-carrying portion, and which are connected by a joint extending lengthwise of the shoe along the center line of the shoe.

In testimony whereof we have hereunto signed our names.

FRANK H. SMITH.
THOMAS A. SINDELAR.